(12) United States Patent
Hanna et al.

(10) Patent No.: US 9,055,198 B2
(45) Date of Patent: Jun. 9, 2015

(54) MIRROR SYSTEM AND METHOD FOR ACQUIRING BIOMETRIC DATA

(75) Inventors: Keith J. Hanna, New York, NY (US); George Herbert Needham Riddle, Princeton, NJ (US); David James Hirvonen, Brooklyn, NY (US); David Hammond Sliney, Fallston, MD (US)

(73) Assignee: EYELOCK, INC., Tolima Valley Caguas, PR (US)

( * ) Notice: Subject to any disclaimer, the term of this patent is extended or adjusted under 35 U.S.C. 154(b) by 43 days.

(21) Appl. No.: 13/493,455

(22) Filed: Jun. 11, 2012

(65) Prior Publication Data

US 2012/0242821 A1 Sep. 27, 2012

Related U.S. Application Data

(63) Continuation of application No. 12/658,706, which is a continuation of application No. PCT/US2008/074751, filed on Aug. 29, 2008, now Pat. No. 8,212,870, which is a continuation of application No. PCT/US2008/074737, filed on Aug. 29, 2008.

(60) Provisional application No. 60/969,607, filed on Sep. 1, 2007.

(51) Int. Cl.
*H04N 7/18* (2006.01)
(52) U.S. Cl.
CPC ........................................ *H04N 7/18* (2013.01)
(58) Field of Classification Search
CPC ........................................................ H04N 7/18

USPC ............ 348/78; 382/115, 116, 117, 118, 124; 351/220, 221

See application file for complete search history.

(56) References Cited

U.S. PATENT DOCUMENTS

| | | | |
|---|---|---|---|
| 4,231,661 A | 11/1980 | Walsh et al. | |
| 4,641,349 A | 2/1987 | Flom et al. | |
| 4,910,725 A | 3/1990 | Drexler et al. | |
| 4,923,263 A * | 5/1990 | Johnson | 359/220.1 |
| 5,140,469 A | 8/1992 | Lamarre et al. | |
| 5,259,040 A | 11/1993 | Hanna | |
| 5,291,560 A | 3/1994 | Daugman | |
| 5,488,675 A | 1/1996 | Hanna | |

(Continued)

FOREIGN PATENT DOCUMENTS

| | | |
|---|---|---|
| JP | 2007-249556 | 9/2007 |
| KR | 1020020078225 | 10/2002 |

(Continued)

OTHER PUBLICATIONS

Belcher et al, "A Selective Feature Information Approach for Iris Image-Quality Measure", IEEE, 3(3):572- 577 (2008).

(Continued)

*Primary Examiner* — Behrooz Senfi
*Assistant Examiner* — Maria Vazquez Colon
(74) *Attorney, Agent, or Firm* — John D. Lanza; Foley & Lardner LLP

(57) ABSTRACT

A system and method for obtaining biometric imagery such as iris imagery from large capture volumes is disclosed wherein a substantially rotationally symmetric mirror such as a cone or sphere is rotated at a constant velocity about a central axis.

17 Claims, 3 Drawing Sheets

(56) References Cited

U.S. PATENT DOCUMENTS

| | | | |
|---|---|---|---|
| 5,572,596 A | 11/1996 | Wildes et al. | |
| 5,581,629 A | 12/1996 | Hanna et al. | |
| 5,613,012 A | 3/1997 | Hoffman et al. | |
| 5,615,277 A | 3/1997 | Hoffman | |
| 5,737,439 A | 4/1998 | Lapsley et al. | |
| 5,751,836 A | 5/1998 | Wildes et al. | |
| 5,764,789 A | 6/1998 | Pare, Jr. et al. | |
| 5,802,199 A | 9/1998 | Pare, Jr. et al. | |
| 5,805,719 A | 9/1998 | Pare, Jr. et al. | |
| 5,838,812 A | 11/1998 | Pare, Jr. et al. | |
| 5,901,238 A | 5/1999 | Matsushita | |
| 5,953,440 A | 9/1999 | Zhang et al. | |
| 5,978,494 A | 11/1999 | Zhang | |
| 6,021,210 A | 2/2000 | Camus et al. | |
| 6,028,949 A | 2/2000 | McKendall | |
| 6,055,322 A | 4/2000 | Salganicoff et al. | |
| 6,064,752 A | 5/2000 | Rozmus et al. | |
| 6,069,967 A | 5/2000 | Rozmus et al. | |
| 6,088,470 A | 7/2000 | Camus et al. | |
| 6,144,754 A | 11/2000 | Okano et al. | |
| 6,149,061 A | 11/2000 | Massieu et al. | |
| 6,192,142 B1 | 2/2001 | Pare, Jr. et al. | |
| 6,222,903 B1 * | 4/2001 | Kim et al. | 378/22 |
| 6,246,751 B1 | 6/2001 | Bergl et al. | |
| 6,247,813 B1 | 6/2001 | Kim et al. | |
| 6,252,977 B1 | 6/2001 | Salganicoff et al. | |
| 6,289,113 B1 | 9/2001 | McHugh et al. | |
| 6,301,375 B1 | 10/2001 | Choi | |
| 6,320,610 B1 * | 11/2001 | Van Sant et al. | 348/143 |
| 6,349,171 B1 | 2/2002 | Koike | |
| 6,366,682 B1 | 4/2002 | Hoffman et al. | |
| 6,373,968 B2 | 4/2002 | Okano et al. | |
| 6,377,699 B1 | 4/2002 | Musgrave et al. | |
| 6,424,727 B1 | 7/2002 | Musgrave et al. | |
| 6,483,930 B1 | 11/2002 | Musgrave et al. | |
| 6,532,298 B1 | 3/2003 | Cambier et al. | |
| 6,542,624 B1 | 4/2003 | Oda | |
| 6,545,810 B1 * | 4/2003 | Takada et al. | 359/618 |
| 6,546,121 B1 | 4/2003 | Oda | |
| 6,554,705 B1 | 4/2003 | Cumbers | |
| 6,587,597 B1 * | 7/2003 | Nakao et al. | 382/284 |
| 6,594,376 B2 | 7/2003 | Hoffman et al. | |
| 6,594,377 B1 | 7/2003 | Kim et al. | |
| 6,652,099 B2 | 11/2003 | Chae et al. | |
| 6,700,998 B1 | 3/2004 | Murata | |
| 6,701,029 B1 | 3/2004 | Berfanger et al. | |
| 6,714,665 B1 * | 3/2004 | Hanna et al. | 382/117 |
| 6,760,467 B1 | 7/2004 | Min et al. | |
| 6,763,148 B1 | 7/2004 | Sternberg et al. | |
| 6,819,219 B1 | 11/2004 | Bolle et al. | |
| 6,832,044 B2 | 12/2004 | Doi et al. | |
| 6,850,631 B1 | 2/2005 | Oda et al. | |
| 6,917,695 B2 | 7/2005 | Teng et al. | |
| 6,920,236 B2 | 7/2005 | Prokoski | |
| 6,930,707 B2 * | 8/2005 | Bates et al. | 348/78 |
| 6,944,318 B1 | 9/2005 | Takata et al. | |
| 6,950,536 B2 | 9/2005 | Houvener | |
| 6,980,670 B1 | 12/2005 | Hoffman et al. | |
| 6,985,608 B2 | 1/2006 | Hoffman et al. | |
| 7,007,298 B1 | 2/2006 | Shinzaki et al. | |
| 7,020,351 B1 | 3/2006 | Kumar et al. | |
| 7,047,418 B1 | 5/2006 | Ferren et al. | |
| 7,095,901 B2 | 8/2006 | Lee et al. | |
| 7,106,366 B2 | 9/2006 | Parker et al. | |
| 7,146,027 B2 | 12/2006 | Kim et al. | |
| 7,152,782 B2 | 12/2006 | Shenker et al. | |
| 7,209,271 B2 | 4/2007 | Lewis et al. | |
| 7,212,330 B2 | 5/2007 | Seo et al. | |
| 7,221,486 B2 | 5/2007 | Makihira et al. | |
| 7,236,534 B1 | 6/2007 | Morejon et al. | |
| 7,248,719 B2 | 7/2007 | Hoffman et al. | |
| 7,271,939 B2 | 9/2007 | Kono | |
| 7,272,265 B2 | 9/2007 | Kouri et al. | |
| 7,346,472 B1 | 3/2008 | Moskowitz et al. | |
| 7,385,626 B2 | 6/2008 | Aggarwal et al. | |
| 7,398,925 B2 | 7/2008 | Tidwell et al. | |
| 7,414,737 B2 | 8/2008 | Cottard et al. | |
| 7,418,115 B2 | 8/2008 | Northcott et al. | |
| 7,428,320 B2 | 9/2008 | Northcott et al. | |
| 7,542,590 B1 | 6/2009 | Robinson et al. | |
| 7,545,962 B2 | 6/2009 | Peirce et al. | |
| 7,558,406 B1 | 7/2009 | Robinson et al. | |
| 7,558,407 B2 | 7/2009 | Hoffman et al. | |
| 7,574,021 B2 | 8/2009 | Matey | |
| 7,583,822 B2 | 9/2009 | Guillemot et al. | |
| 7,606,401 B2 | 10/2009 | Hoffman et al. | |
| 7,616,788 B2 | 11/2009 | Hsieh et al. | |
| 7,639,840 B2 | 12/2009 | Hanna et al. | |
| 7,660,700 B2 | 2/2010 | Moskowitz et al. | |
| 7,693,307 B2 | 4/2010 | Rieul et al. | |
| 7,697,786 B2 | 4/2010 | Camus et al. | |
| 7,715,595 B2 | 5/2010 | Kim et al. | |
| 7,719,566 B2 | 5/2010 | Guichard | |
| 7,760,919 B2 | 7/2010 | Namgoong | |
| 7,770,019 B2 | 8/2010 | Ferren et al. | |
| 7,797,606 B2 | 9/2010 | Chabanne | |
| 7,801,335 B2 | 9/2010 | Hanna et al. | |
| 7,847,688 B2 | 12/2010 | Bernard et al. | |
| 7,869,627 B2 | 1/2011 | Northcott et al. | |
| 7,912,252 B2 | 3/2011 | Ren et al. | |
| 7,916,908 B1 | 3/2011 | Thomas | |
| 7,925,059 B2 | 4/2011 | Hoyos et al. | |
| 7,929,017 B2 | 4/2011 | Aggarwal et al. | |
| 7,929,732 B2 | 4/2011 | Bringer et al. | |
| 7,949,295 B2 | 5/2011 | Kumar et al. | |
| 7,949,494 B2 | 5/2011 | Moskowitz et al. | |
| 7,978,883 B2 | 7/2011 | Rouh et al. | |
| 8,009,876 B2 | 8/2011 | Kim et al. | |
| 8,025,399 B2 | 9/2011 | Northcott et al. | |
| 8,028,896 B2 | 10/2011 | Carter et al. | |
| 8,090,246 B2 | 1/2012 | Jelinek | |
| 8,092,021 B1 | 1/2012 | Northcott et al. | |
| 8,132,912 B1 | 3/2012 | Northcott et al. | |
| 8,159,328 B2 | 4/2012 | Luckhardt | |
| 8,170,295 B2 | 5/2012 | Fujii et al. | |
| 8,181,858 B2 | 5/2012 | Carter et al. | |
| 8,195,044 B2 | 6/2012 | Hanna et al. | |
| 8,212,870 B2 | 7/2012 | Hanna et al. | |
| 8,214,175 B2 | 7/2012 | Moskowitz et al. | |
| 8,233,680 B2 | 7/2012 | Bringer et al. | |
| 8,243,133 B1 | 8/2012 | Northcott et al. | |
| 8,260,008 B2 | 9/2012 | Hanna et al. | |
| 8,279,042 B2 | 10/2012 | Beenau et al. | |
| 8,280,120 B2 | 10/2012 | Hoyos et al. | |
| 8,289,390 B2 | 10/2012 | Aggarwal et al. | |
| 8,306,279 B2 | 11/2012 | Hanna | |
| 8,317,325 B2 | 11/2012 | Raguin et al. | |
| 8,364,646 B2 | 1/2013 | Hanna et al. | |
| 8,411,909 B1 | 4/2013 | Zhao et al. | |
| 8,442,339 B2 | 5/2013 | Martin et al. | |
| 8,443,202 B2 | 5/2013 | White et al. | |
| 8,553,948 B2 | 10/2013 | Hanna | |
| 8,604,901 B2 | 12/2013 | Hoyos et al. | |
| 8,606,097 B2 | 12/2013 | Hanna et al. | |
| 8,719,584 B2 | 5/2014 | Mullin | |
| 2001/0028730 A1 | 10/2001 | Nahata | |
| 2002/0110286 A1 | 8/2002 | Cheatle et al. | |
| 2002/0131623 A1 | 9/2002 | Musgrave et al. | |
| 2002/0136435 A1 | 9/2002 | Prokoski | |
| 2003/0103212 A1 | 6/2003 | Westphal et al. | |
| 2003/0151674 A1 | 8/2003 | Lin | |
| 2004/0013288 A1 | 1/2004 | Svensson et al. | |
| 2004/0042643 A1 | 3/2004 | Yeh | |
| 2004/0071363 A1 | 4/2004 | Kouri et al. | |
| 2005/0084137 A1 | 4/2005 | Kim et al. | |
| 2005/0084179 A1 | 4/2005 | Hanna et al. | |
| 2005/0105778 A1 | 5/2005 | Sung et al. | |
| 2005/0226471 A1 | 10/2005 | Singh et al. | |
| 2005/0264758 A1 | 12/2005 | Wakamori | |
| 2005/0270386 A1 | 12/2005 | Saitoh et al. | |
| 2005/0285943 A1 | 12/2005 | Cutler | |
| 2006/0028552 A1 | 2/2006 | Aggarwal et al. | |
| 2006/0029262 A1 | 2/2006 | Fujimatsu et al. | |
| 2006/0073449 A1 | 4/2006 | Kumar et al. | |

(56) References Cited

U.S. PATENT DOCUMENTS

| | | |
|---|---|---|
| 2006/0074986 A1 | 4/2006 | Mallalieu et al. |
| 2006/0097172 A1 | 5/2006 | Park |
| 2006/0120707 A1 | 6/2006 | Kusakari et al. |
| 2006/0170813 A1 | 8/2006 | Morofuji |
| 2006/0188169 A1 | 8/2006 | Tener et al. |
| 2006/0204121 A1 | 9/2006 | Bryll |
| 2006/0279630 A1 | 12/2006 | Aggarwal et al. |
| 2007/0098229 A1 | 5/2007 | Wu et al. |
| 2007/0110285 A1 | 5/2007 | Hanna et al. |
| 2007/0188613 A1 | 8/2007 | Nobori et al. |
| 2007/0206839 A1 | 9/2007 | Hanna et al. |
| 2007/0211922 A1 | 9/2007 | Crowley et al. |
| 2007/0286462 A1 | 12/2007 | Usher et al. |
| 2007/0286524 A1 | 12/2007 | Song |
| 2008/0031610 A1 | 2/2008 | Border et al. |
| 2008/0044063 A1 | 2/2008 | Friedman et al. |
| 2008/0075334 A1 | 3/2008 | Determan et al. |
| 2008/0089554 A1 | 4/2008 | Tabankin et al. |
| 2008/0122578 A1 | 5/2008 | Hoyos et al. |
| 2008/0291279 A1 | 11/2008 | Samarasekera et al. |
| 2009/0074256 A1 | 3/2009 | Haddad |
| 2009/0097715 A1 | 4/2009 | Cottard et al. |
| 2009/0161925 A1 | 6/2009 | Cottard et al. |
| 2009/0207251 A1 | 8/2009 | Kobayashi et al. |
| 2009/0219405 A1 | 9/2009 | Kaneda et al. |
| 2009/0231096 A1 | 9/2009 | Bringer et al. |
| 2009/0232418 A1 | 9/2009 | Lolacono et al. |
| 2009/0268045 A1 | 10/2009 | Sur et al. |
| 2009/0274345 A1 | 11/2009 | Hanna et al. |
| 2009/0278922 A1 | 11/2009 | Tinker et al. |
| 2010/0014720 A1 | 1/2010 | Hoyos et al. |
| 2010/0021016 A1 | 1/2010 | Cottard et al. |
| 2010/0033677 A1 | 2/2010 | Jelinek |
| 2010/0074477 A1 | 3/2010 | Fujii et al. |
| 2010/0127826 A1 | 5/2010 | Saliba et al. |
| 2010/0201853 A1 | 8/2010 | Ishiga |
| 2010/0232655 A1 | 9/2010 | Hanna |
| 2010/0238407 A1 | 9/2010 | Dai |
| 2010/0246903 A1 | 9/2010 | Cottard |
| 2010/0253816 A1 | 10/2010 | Hanna |
| 2010/0278394 A1 | 11/2010 | Raguin et al. |
| 2010/0310070 A1 | 12/2010 | Bringer et al. |
| 2011/0002510 A1 | 1/2011 | Hanna |
| 2011/0007949 A1 | 1/2011 | Hanna et al. |
| 2011/0119111 A1 | 5/2011 | Hanna |
| 2011/0119141 A1 | 5/2011 | Hoyos et al. |
| 2011/0158486 A1 | 6/2011 | Bringer et al. |
| 2011/0194738 A1 | 8/2011 | Choi et al. |
| 2011/0211054 A1 | 9/2011 | Hanna et al. |
| 2011/0277518 A1 | 11/2011 | Lais et al. |
| 2012/0127295 A9 | 5/2012 | Hanna et al. |
| 2012/0187838 A1 | 7/2012 | Hanna |
| 2012/0212597 A1 | 8/2012 | Hanna |
| 2012/0219279 A1 | 8/2012 | Hanna et al. |
| 2012/0239458 A9 | 9/2012 | Hanna |
| 2012/0240223 A1 | 9/2012 | Tu |
| 2012/0242820 A1 | 9/2012 | Hanna et al. |
| 2012/0243749 A1 | 9/2012 | Hanna et al. |
| 2012/0257797 A1 | 10/2012 | Leyvand et al. |
| 2012/0268241 A1 | 10/2012 | Hanna et al. |
| 2012/0293643 A1 | 11/2012 | Hanna |
| 2012/0300052 A1 | 11/2012 | Hanna et al. |
| 2012/0300990 A1 | 11/2012 | Hanna et al. |
| 2012/0321141 A1 | 12/2012 | Hoyos et al. |
| 2012/0328164 A1 | 12/2012 | Hoyos et al. |
| 2013/0051631 A1 | 2/2013 | Hanna |
| 2013/0093838 A1 | 4/2013 | Tan et al. |
| 2013/0108125 A1 | 5/2013 | Storm et al. |
| 2013/0110859 A1 | 5/2013 | Hanna et al. |
| 2013/0162798 A1 | 6/2013 | Hanna et al. |
| 2013/0162799 A1 | 6/2013 | Hanna et al. |
| 2013/0182093 A1 | 7/2013 | Hanna et al. |
| 2013/0182094 A1 | 7/2013 | Hanna et al. |
| 2013/0182095 A1 | 7/2013 | Hanna et al. |
| 2013/0182913 A1 | 7/2013 | Hoyos |
| 2013/0182915 A1 | 7/2013 | Hanna |
| 2013/0194408 A1 | 8/2013 | Hanna |
| 2013/0212655 A1 | 8/2013 | Hoyos |
| 2013/0223840 A1 | 8/2013 | Hanna et al. |
| 2013/0251215 A1 | 9/2013 | Coons, David D. |
| 2013/0294659 A1 | 11/2013 | Hanna |
| 2014/0064574 A1 | 3/2014 | Hanna |
| 2014/0072183 A1 | 3/2014 | Hanna |

FOREIGN PATENT DOCUMENTS

| | | |
|---|---|---|
| KR | 1020030005113 | 1/2003 |
| KR | 1003738500000 | 2/2003 |
| KR | 1020030034258 | 5/2003 |
| KR | 1020030051970 | 6/2003 |
| KR | 2003216700000 | 7/2003 |
| KR | 1004160650000 | 1/2004 |
| KR | 2003402730000 | 1/2004 |
| KR | 2003411370000 | 1/2004 |
| KR | 2003526690000 | 5/2004 |
| KR | 2003552790000 | 6/2004 |
| KR | 2003620320000 | 9/2004 |
| KR | 2003679170000 | 11/2004 |
| KR | 1020050005336 | 1/2005 |
| KR | 2003838080000 | 5/2005 |
| KR | 1020050051861 | 6/2005 |
| KR | 2004046500000 | 12/2005 |
| KR | 1005726260000 | 4/2006 |
| KR | 10-2009-0086891 | 8/2009 |
| KR | 10-2009-0106791 A | 10/2009 |
| KR | 10-2010-0049407 | 5/2010 |
| KR | 1011976780000 | 10/2012 |
| KR | 1013667480000 | 2/2014 |
| KR | 1013740490000 | 3/2014 |
| KR | 1020140028950 | 3/2014 |
| KR | 1020140039803 | 4/2014 |
| KR | 1020140050501 | 4/2014 |
| WO | WO 2008/054396 A1 | 5/2008 |
| WO | WO 2009/029757 A1 | 3/2009 |
| WO | WO 2009/029765 A1 | 3/2009 |
| WO | WO 2010/062371 A1 | 6/2010 |
| WO | WO 2011/093538 A1 | 8/2011 |
| WO | WO 2012/112788 A2 | 8/2012 |
| WO | WO 2013/109295 A2 | 7/2013 |

OTHER PUBLICATIONS

Bergen, J.R., et al., Hierarchical Model-Based Motion Estimation, European Conf. On Computer Vision (1993).

Daugman, John, "How Iris Recognition Works," IEEE Transaction on Circuits and Systems for Video Technology, 14(1):21-30 (2004).

Galvin, B., et al., Recovering Motion Fields: An Evaluation of Eight Optical Flow Algorithms, *Proc. of the British Machine Vision Conf.* (1998).

He, Y. et al, "A fast iris image quality evaluation method based on weighted entropy", *SPIE*, 6623:1-8 (2007).

He, Xiaofu et al., "Contactless Autofeedback Iris Capture Design", IEEE Transactions on Instrumentation and Measurement, IEEE Service Center, Piscataway, NJ, U.S. 57(7):1369-1375 (2008).

Kumar, R., et al., "Direct recovery of shape from multiple views: a parallax based approach", 12th IAPR Int'l Conf. On Pattern Recognition (1994).

Lu, Huiqi et al., "Iris Recognition on Low Computational Power Mobile Devices", 23 pp., (2011). Retrieved from the Internet: URL:http:jjcdn.intechopen.comjpdfs-wm/14646.pdf [retrieved on Jul. 23, 2014].

Ma, L. et al, "Personal Identification Based on Iris Texture Analysis", IEEE: Pattern Analysis and Machine Intelligence, 25(12):1519-1533 (2003).

Nishino, K., et al., "The World in an Eye", IEEE Conf. On Pattern Recognition, 1:444-451 (2004).

Peters, Tanya H. et al., "Effects of segmentation routine and acquisition environment on iris recognition", 97 pp., (2009). Retrieved from the Internet: URL:http://etd.nd.edu/Etd-db/thesesjavailablejetd-12112009-103348/ [retrieved on Jul. 21, 2014].

(56) References Cited

OTHER PUBLICATIONS

Wildes, R.P., "Iris Recognition: An Emerging Biometric Technology", Proc. IEEE 85(9):1348-1363 (1997).
Written Opinion of the International Searching Authority in PCT/US2008/074737, mailed Jan. 23, 2009, 6 pages.
International Search Report in PCT/US2008/074737, mailed Jan. 23, 2009, 4 pages.
International Preliminary Report on Patentability in PCT/US2008/074737 dated Mar. 2, 2010, 7 pages.
Notice of Allowance in U.S. Appl. No. 12/658,706, mailed Feb. 24, 2012, 8 pages.
Written Opinion of the International Searching Authority in PCT/US2008/074751 mailed Jan. 28, 2009, 4 pages.
International Search Report in PCT/US2008/074751, mailed Jan. 28, 2009, 2 pages.
International Preliminary Report on Patentability in PCT/US2008/074751 dated Mar. 2, 2010, 5 pages.
Written Opinion of the International Searching Authority in PCT/US2012/025468, mailed Sep. 14, 2012, 3 pages.
International Search Report in PCT/US2012/025468, mailed Sep. 14, 2012, 3 pages.
International Preliminary Report on Patentability in PCT/US2012/025468 dated Aug. 21, 2013, 4 pages.
Office Action in U.S. Appl. No. 12/675,189 dated Dec. 7, 2012.
International Preliminary Report on Patentability in PCT/US2012/032391, dated Oct. 8, 2013, 8 pages.
Written Opinion of the International Searching Authority in PCT/US2012/032391, mailed Jul. 25, 2013, 7 pages.
International Search Report in PCT/US2012/032391, mailed Jul. 25, 2013, 3 pages.
Office Action in U.S. Appl. No. 13/773,168, mailed Oct. 8, 2013, 16 pages.
Office Action in U.S. Appl. No. 13/773,159, mailed Oct. 31, 2013, 16 pages.
Office Action in U.S. Appl. No. 13/440,707, mailed Jan. 14, 2014, 16 pages.
Office Action in U.S. Appl. No. 13/807,256, mailed Jan. 29, 2014, 16 pages.
Office Action in U.S. Appl. No. 13/398,562, mailed May 21, 2014, 11 pages.
Office Action in U.S. Appl. No. 13/773,159, mailed Jun. 18, 2014, 26 pages.
Office Action in U.S. Appl. No. 13/493,462, mailed Jul. 1, 2014, 11 pages.
Office Action in U.S. Appl. No. 13/773,168, mailed Jul. 16, 2014, 19 pages.
Extended European Search Report in EP Application No. EP 12866256.6, dated Aug. 1, 2014, 7 pages.
Office Action in U.S. Appl. No. 13/786,079, mailed Sep. 26, 2014, 8 pages.
Office Action in U.S. Appl. No. 13/440,707, mailed Sep. 30, 2014, 22 pages.

\* cited by examiner

MIRROR SYSTEM AND METHOD FOR ACQUIRING BIOMETRIC DATA

RELATED APPLICATIONS

This application is a continuation of and claims priority to U.S. application Ser. No. 12/658,706, filed Feb. 16, 2010, entitled "Mirror System and Method for Acquiring Biometric Data," which is:

a continuation of and claims priority to PCT Application No. PCT/US2008/074751, filed Aug. 29, 2008, entitled "Mirror System and Method for Acquiring Biometric Data," which claims priority to U.S. provisional application 60/969,607, filed Sep. 1, 2007, entitled "Methodology for Acquiring Biometric Data Large Volumes," which are both hereby incorporated by reference in their entireties; and a continuation of and claims priority to PCT Application No. PCT/US2008/074737, filed Aug. 29, 2008, entitled "System And Method for Iris Data Acquisition For Biometric Identification," which claims priority to U.S. provisional application 60/969,607, filed Sep. 1, 2007, entitled "Methodology for Acquiring Biometric Data Large Volumes," which are both hereby incorporated by reference in their entireties.

BACKGROUND

This invention relates to systems and methods for acquiring biometric and other imagery, biometric acquisition, identification, fraud detection, and security systems and methods, particularly biometric systems and methods which employ iris recognition with a camera having a field of view. More particularly the invention relates to systems and methods for very quickly acquiring iris imagery within a wide capture volume.

Iris recognition systems have been in use for some time. The acquisition of images suitable for iris recognition is inherently a challenging problem. This is due to many reasons. As an example, the iris itself is relatively small (approximately 1 cm in diameter) and for many identification systems it is desirable to obtain a subject's iris data from a great distance in order to avoid constraining the position of the subject. This results in a small field of view and a small depth of field. Even systems which obtain iris data from a close in subject must be adapted to subjects which do not stay absolutely still. Systems must also deal with subjects which blink involuntarily or drop or swivel their head momentarily to check on the whereabouts of luggage.

There is therefore a need to scan very quickly or else the person will have moved out of the capture volume or the subject's motion will cause a blur. In the current state of the art, attempts to resolve this problem comprise using a flat mirror to scan but such attempts have not so far resolved the motion blur problem, especially when the camera is zoomed in. The image motion in terms of pixels/second is very high which makes it very difficult to obtain high quality imagery with prior art systems in these situations.

In biometric applications, one or more image sensors are often used to collect data for subsequent analysis and biometric matching. For example, with the face or iris biometric, a single camera and lens is often used to collect the biometric data. There is an obvious trade-off between the resolution required for biometric analysis and matching, and the field of view of the lens. For example, as the field of view of the lens increases, the capture volume or coverage in which the biometric data can be observed increases, but the resolution of the data decreases proportionally. Multiple cameras and lenses covering a larger volume is an obvious solution, but it requires the expense of additional cameras, optics and processing.

Another approach for increasing the capture volume has been to use controllable mirrors that point the camera coverage in different locations. Specifically, in U.S. Pat. No. 6,714,665 it is proposed to use a wide field of view camera to determine where to point a mirror that was mounted on a pan/tilt/zoom assembly. However approaches that point mirrors in such a fashion have to handle one or more key problems, namely: (i) the time latency involved in moving the camera to a location, (ii) vibration of the mirror and the resulting settling time of the mirror as it stops and starts motion, (iii) the complexity of the mechanical arrangement, (iv) the reliability, longevity and expense of the opto-mechanical components for such a moving assembly.

U.S. Pat. No. 6,320,610, Van Sant et al disclosed acquisition of biometric data with a mirror on a pan/tilt platform, or a camera on pan/tilt platform. The problem with that approach is that it is very expensive or physically impossible to use such a mechanism to point at 2 or 3 places in a scene at a very high rate—for example, 5-50 times a second. If there is a mechanical mirror or pointing mechanism, then there is substantial inertia preventing the rapid stopping and starting of the assembly quickly and furthermore such a system needs a very powerful actuator/motor to rotate a camera assembly. In addition, there is substantial settling time for the mirror or camera to stop vibrating as the mirror or pan/tilt assembly stops before imagery is acquired, so essentially it makes it almost physically impossible to scan at such high rates.

SUMMARY

It is an object of the present invention to acquire biometric data within large capture volumes with high resolution using fewer cameras, or one camera, and without the problems of prior art systems.

The present invention overcomes the problems of the prior art systems and improves on them by using a continuous mechanical mechanism to solve the inertia problem, and translates that into imagery that stops and stares at one location and then instantaneously jumps to stare at another location.

In one aspect the invention comprises using a rotating curved mirror and tilting which allows the image to appear frozen for a fraction of a second before moving onto the next tile of the scan which also appears frozen.

In another aspect the invention comprises a system for acquiring biometric imagery in a large capture volume from an unconstrained subject comprising a rotationally symmetric mirror, motor means to rotate the mirror at a constant rotational velocity about an axis, and a sensor configured to acquire biometric imagery reflected off of the mirror as it is rotated about the axis.

In some embodiments the rotationally symmetric mirror is comprised of one or more conical sections.

The system can be configured to obtain a set of still images. In some embodiments the system is configured for iris recognition and comprises one or more conical sections arranged to rotate at a substantially constant rotational velocity around their common axis.

In another aspect the invention comprises a reflection device comprising a first surface that reflects light off that surface as if off a substantially rotationally symmetric surface; a second surface different from the first surface that reflects light off that surface as if off a substantially rotationally symmetric surface; wherein said first and said second surfaces are mounted on the same axis such that rotational symmetry of each surface is maintained.

The method aspect of the invention comprises acquiring imagery in a large capture volume by configuring a sensor to view a scene reflected off a non-flat surface; mounting the said surface on a rotating axis; and acquiring imagery of the scene reflected off said surface.

In certain embodiments a set of still images of portions of the scene are obtained.

BRIEF DESCRIPTION OF THE DRAWINGS

These and other objects, features, and advantages of embodiments are presented in greater detail in the following description when read in relation to the drawings, but not limited to these figures, in which.

DETAILED DESCRIPTION

While the invention is capable of many embodiments, only a few embodiments are illustrated in detail herein.

Figure 1:
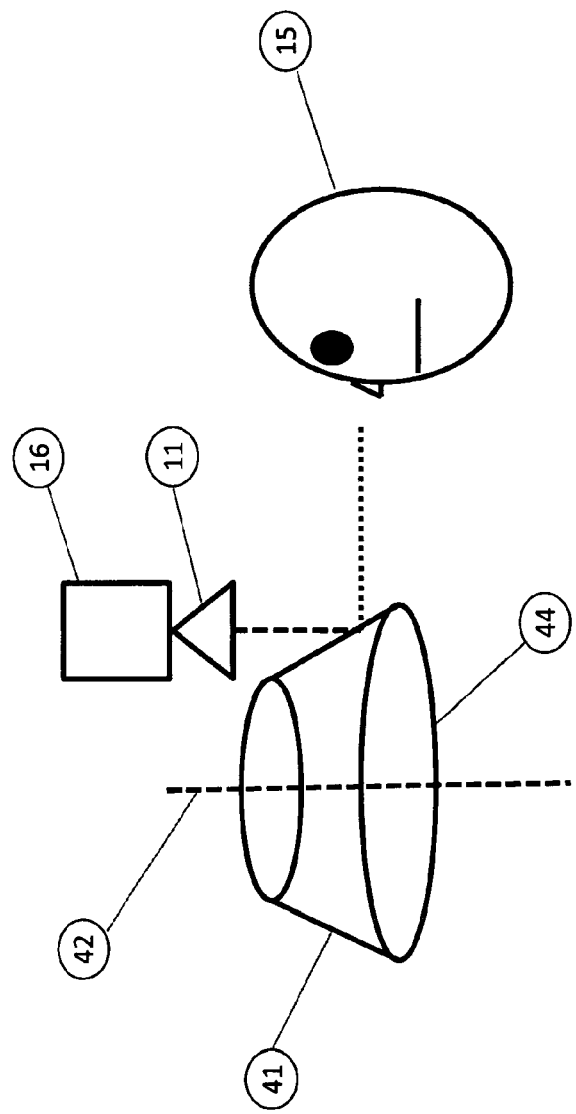
FIG. 1 schematically illustrates a system according to the invention comprising a rotating non-flat, conical shaped mirror, camera and lens, and subject.

FIG. 1 illustrates an embodiment of the invention wherein a first non-flat mirror section 41 is rotated about axis 42 (motor not illustrated), and a second non-flat mirror section 44 is also rotated about axis 42 by the same motor. The lens 11 of the camera 16 receives an image of the subject 15 reflected off surface 44 to the lens 11.

Figure 2:
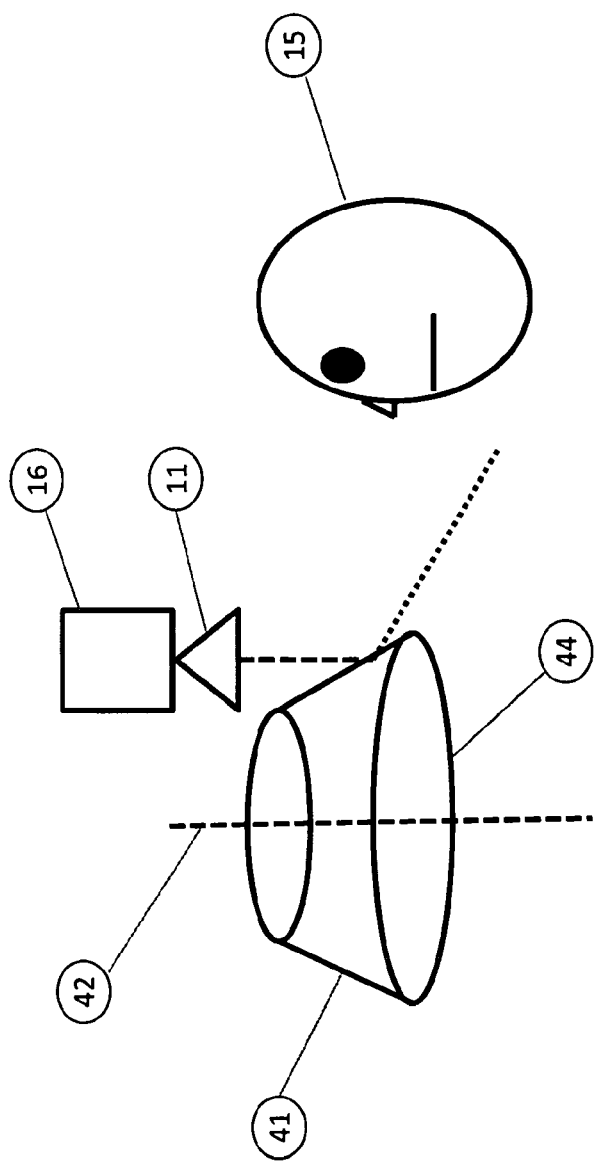
FIG. 2 is a second schematic illustration of a system according to the invention where the camera receives image from a second portion of the subject.

FIG. 2 illustrates the system of FIG. 1 at a different time instant at which an image of the subject 15 is reflected off of surface 41 and a different portion of the subject is reflected off mirror surface 41 to the lens.

Figure 3:
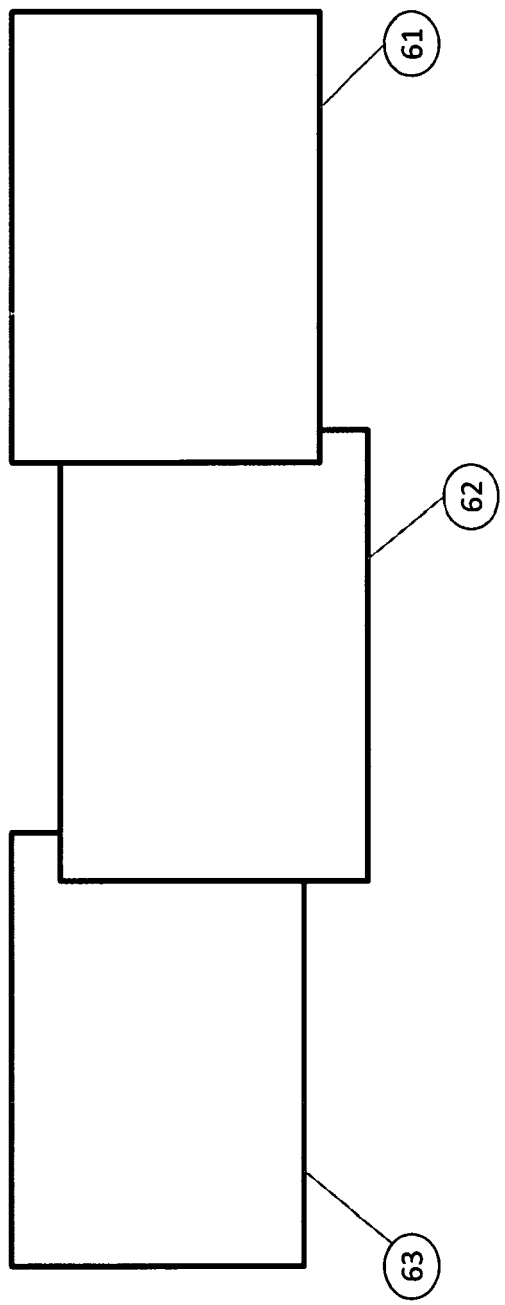
FIG. 3 illustrates the tiling aspect of the invention.

FIG. 3 illustrates a set of three tiles 61-63, which are sections of the subject where the camera imagery points successively.

The following is a general description of a system and method according to the invention. An image is acquired using a camera system 10, 11, or any other image recording device. A camera system us used that can either capture images synchronously at a constant rate, or asynchronously on request by a computer-controlled trigger signal. The camera may be operated at a variable acquisition rate depending on the results of previous processing.

The method is highly effective in many respects. First, if the disposition of the subject is immediately amenable to successful data acquisition (e.g. eyes are open and their face is facing the system), then the system will acquire iris imagery very rapidly.

However, of the subject is fidgeting or unable to remain stationary, or is distracted by baggage or children for example, then the acquisition system will still acquire imagery, although it might take a slightly longer period of time. However, the acquisition time for an amenable user will not be penalized by the system's capability to acquire data in the case of a less amenable user. This is crucial when subject throughput is considered.

The invention performs temporal multiplexing of the camera and optics such that at one time instant the camera sensor acquires data from a first part of the scene and at another time instant the camera sensor acquires data from a second part of the scene, that may or may not substantially overlap the first part of the scene. This process is repeated for additional parts of the scene, until data is once again acquired from the first part of the scene. This process results in tiles which do not substantially overlap as illustrated in FIG. 3. The invention includes a set of configurations of mirrors, cameras and lenses such that this temporal multiplexing and data acquisition throughout a specified capture volume can be performed using opto-mechanical assemblies that move, but have been designed to only move in a fashion such that the mechanics and optics required are highly reliable, have negligible maintenance requirements, require minimal calibration, and are low-cost and small in size.

In this configuration, a non-flat mirror is continually rotated at a constant rotational velocity by a small electrical mirror. The mirror is designed to be reflective in the wavelengths required for the biometric camera acquisition device. The non-flat mirror can, for example, be spherical, conical, or other shapes. In the case of conical shapes, a series of conical sections can be joined together. For example, FIG. 3 shows 3 tiles produced by 3 conical sections joined together on one axis.

The camera, lens, or other imager, and motor are fixed. The motor is designed to rotate at a constant angular velocity. Constant angular motion eliminates mechanical vibration due to stop/start motion and the motor is very reliable. As the mirror rotates, the part of the scene viewed by the lens changes as each different conical mirrored section comes into view of the lens. However, the part of the scene viewed by the lens when each particular conical mirrored sections is in view of the lens does not change even though the mirror is rotating, due to the rotationally symmetric nature of each mirror segment. During this time period of the mirrors rotation, high quality imagery of the scene at a particular location is acquired.

The specific location of the scene that is imaged as the mirror rotates depends on the position on the mirror to which the sensor is pointed.

To illustrate further, if the camera is mounted such that it is pointed at a first substantially rotationally symmetric mirror (FIG. 1, 44), then even though the non-flat mirror is rotating, the portion of view reflected off the mirror remains constant and in this case the imagery is collected from an approximately horizontal direction. As the mirror assembly rotates to bring a second different substantially rotationally symmetric mirror into view. (FIG. 2, 41), then a second portion of the view, in this case the lower portion, is reflected off the mirrored surface and collected.

Additional scan patterns can be implemented by combining two or more mirror/motor assemblies in optical series such that the resultant scan pattern is the combination of each individual scan patterns. More specifically, one rotating mirror assembly can be mounted with a vertical orientation of the axis of rotation, which provides a scan pattern in the vertical direction. A second rotating mirror assembly can be mounted with a horizontal orientation of the axis of rotation such that the optical path reflects off the first mirror assembly and onto the second mirror assembly. The second mirror assembly provides a scan pattern in the horizontal direction. The speed of rotation of each mirror assembly is carefully controlled such that the combination of the vertical and horizontal scan patterns results in a scan pattern that covers a complete 2 dimensional area. For example, if there are 3 separate mirror surfaces within each of the vertical and horizontal mirror assemblies that cover 3 areas in each of the vertical and horizontal directions, then the speed of rotation of one of the assemblies is controlled to be ⅓ or a third the speed of rotation of the other assembly to ensure that the combined scan pattern covers a complete 2 dimensional area. Position sensors, such as optical encoders that are well known in the art, can be used to both measure rotational velocity as well as measure the angular position of each rotating mirror assembly at any time instant in order to optimize the scan pattern such that the scan in one mirror assembly is transitioning from one region to the next at the same time that the scan is transitioning in the second mirror assembly.

This approach allows large capture volumes to be scanned over time. However, one significant remaining problem is that the during biometric data acquisition, the optical path is such that the subject appears to move in the field of view of the camera—in effect, the camera is virtually scanning across the scene. Depending on the integration time of the sensor, this can introduce motion blur in the image data. This can be mitigated by illuminating the subject by stroboscopic lighting, which is a commonly-used technique to stop apparent motion in images acquired where either the camera and/or subject is moving. The stroboscopic illumination can illuminate the subject externally, or can be directed through the moving mirror assembly using a half-silvered mirror in order to direct the illumination directly at the location of interest.

Since the imagery is reflected off a non-flat surface, the imagery is stretched or deformed. The deformation is highly predictable and is given by the shape of the rotationally symmetric surface. After the imagery has been digitized, the stretching or distortion can be removed by applying an inverse geometric image warping function. As an example, "Corneal Imaging System: Environment from Eyes," K. Nishino and S. K. Nayar, International Journal on Computer Vision, October 2006, describe methods of removing distortion off a spherical surface.

In some embodiments two or more conical sections of different pitch (angle) are combined on a single component that spins around an optical axis. The more conical sections that are added, then the more parts of the scene can be scanned. As the conical sections rotate, when the scene is viewed reflected off one conical section, then a certain part of the field of view is observed and appears stationary. When the scene is viewed reflected off a second conical section, then a different part of the field of view is observed and also appears stationary. The advantage is that a wide area of a scene can be scanned extremely rapidly in contrast with a moving pan/tilt mirror system which introduces motion blur or has a slow scan time. In some embodiments, moderate stroboscopic illumination may be used to stop the motion of the individual in the scene.

The angle of the non-flat mirror such as a cone is chosen based on the field of view of the lens and the optical configuration. For example, consider a single cone with a 45 degree pitch. Imagery is reflected by a full 90 degree angle off the conical surface. If the field of view of the imaging system is 10 degrees, then the second conical surface may have a pitch that is 10/2=5 degrees different from the first cone, which is either 40 or 50 degrees depending on whether the desired second part of the scene to be imaged lies above or below the first part of the scene. In practice, the pitch of the second conical surface will be slightly closer to the pitch of the first surface in order to ensure that there is overlap between the regions being imaged.

While the invention has been described and illustrated in detail herein, various other embodiments, alternatives, and modifications should become apparent to those skilled in the art without departing from the spirit and scope of the invention. Therefore the claims should not be considered limited to the illustrated embodiments.

We claim:

1. A method for acquiring biometric imagery, the method comprising:
    rotating a first reflective device about a first rotational axis, the first reflective device comprising at least a first reflective region and a second reflective region, the first reflective region at least partially asymmetric with respect to the second reflective region about the first rotational axis,
    rotating a second reflective device about a second rotational axis, the second rotational axis being substantially perpendicular to the first rotational axis, the first reflective device reflecting biometric imagery of a subject that is reflected off the second reflective device, and
    acquiring, by a sensor, the biometric imagery reflected off the first reflective device as the first reflective device is rotated about the first rotational axis.

2. The method of claim 1, wherein rotating the first reflective device comprises rotating the first reflective device at a substantially constant rotational velocity around the first rotational axis.

3. The method of claim 1, wherein acquiring the biometric imagery comprises acquiring the biometric imagery in synchronization with the rotation of the first reflective device.

4. The method of claim 1, further comprising illuminating the subject with stroboscopic illumination.

5. The method of claim 4, wherein acquiring the biometric imagery comprises acquiring the biometric imagery in synchronization with the stroboscopic illumination of the subject.

6. The method of claim 1, wherein acquiring the biometric imagery comprises acquiring portions of a scene that are offset with respect to each other.

7. The method of claim 1, further comprising maintaining the sensor in a fixed position with respect to the first rotational axis.

8. The method of claim 1, wherein rotating the second reflective device comprises rotating the second reflective device at a rotational velocity greater than and synchronized with the rotational velocity of the first reflective device.

9. A system for acquiring biometric imagery, the system comprising:
    a first reflective device comprising a first rotational axis and at least a first reflective region and a second reflective region, the first reflective region at least partially asymmetric with respect to the second reflective region about the first rotational axis,
    a second reflective device rotating about a second rotational axis, the second rotational axis being substantially perpendicular to the first rotational axis, the first reflective device reflecting biometric imagery that is reflected off the second reflective device, and
    a sensor configured to acquire the biometric imagery reflected off the first reflective device as the first reflective device is rotated about the first rotational axis.

10. The system of claim 9, wherein the first reflective device rotates at a substantially constant rotational velocity around the first rotational axis.

11. The system of claim 9, wherein the sensor acquires the biometric imagery in synchronization with the rotation of the first reflective device.

12. The system of claim 9, further comprising a stroboscopic light source to illuminate the subject with stroboscopic illumination.

13. The system of claim 12, wherein the sensor is configured to acquire the biometric imagery in synchronization with the stroboscopic illumination of the subject.

14. The system of claim 9, wherein the sensor acquires portions of a scene that are offset with respect to each other.

15. The system of claim 9, wherein the sensor is maintained in a fixed position with respect to the first rotational axis.

16. The system of claim 9, wherein the second reflective device is rotated at a rotational velocity greater than and synchronized with the rotational velocity of the first reflective device.

17. A system for acquiring biometric imagery of a subject, the system comprising:
- a first reflective device defining a first rotational axis and comprising at least one curved reflective region to reflect biometric imagery;
- a motor, mechanically coupled to the first reflective device, to rotate the first reflective device at a constant rotational velocity about the first rotational axis;
- a sensor, in optical communication with the first reflective device, to detect a substantially stationary snapshot of the biometric imagery reflected off the at least one curved reflective region as the motor rotates the first reflective device about the first rotational axis; and
- a processor, operably coupled to the sensor, to apply an inverse geometric image warping function to the biometric imagery detected by the sensor so as to mitigate stretching and/or deformation of the biometric imagery detected by the sensor.

\* \* \* \* \*